(12) United States Patent
Probst et al.

(10) Patent No.: US 9,702,563 B2
(45) Date of Patent: Jul. 11, 2017

(54) COLLAPSIBLE COMBUSTION CONTAINER DEVICES AND ASSOCIATED METHODS

(75) Inventors: Benjamin W. Probst, Orem, UT (US); Steven S. Despain, Moroni, UT (US)

(73) Assignee: Firebox Outdoors LLP, Moroni, UT (US)

(*) Notice: Subject to any disclaimer, the term of this patent is extended or adjusted under 35 U.S.C. 154(b) by 931 days.

(21) Appl. No.: 13/023,766

(22) Filed: Feb. 9, 2011

(65) Prior Publication Data
US 2014/0326720 A1  Nov. 6, 2014

Related U.S. Application Data

(60) Provisional application No. 61/302,665, filed on Feb. 9, 2010.

(51) Int. Cl.
*B65D 6/00* (2006.01)
*F24C 1/16* (2006.01)
*A47J 37/07* (2006.01)
*F24B 1/20* (2006.01)

(52) U.S. Cl.
CPC ............. *F24C 1/16* (2013.01); *A47J 37/0772* (2013.01); *F24B 1/205* (2013.01); *A47J 2037/0777* (2013.01)

(58) Field of Classification Search
CPC ......... F24C 1/16; F24B 1/205; A47J 37/0772; A47J 2037/0777
USPC ............................... 220/6; 126/29, 9 R, 25 R
See application file for complete search history.

(56) References Cited

U.S. PATENT DOCUMENTS

| 1,212,162 | A | * | 1/1917 | Green ........................ 126/9 B |
| 1,238,142 | A | | 8/1917 | Hitchcock |
| 2,061,336 | A | * | 11/1936 | Stuart ........................ 126/25 R |
| 2,896,224 | A | * | 7/1959 | Landry ........................... 5/99.1 |
| 3,384,066 | A | | 5/1968 | Tufts |
| 4,149,514 | A | * | 4/1979 | Latouf ............... A47J 37/0704 126/25 R |

(Continued)

FOREIGN PATENT DOCUMENTS

JP   2001-116259 A   4/2001

OTHER PUBLICATIONS

International Search Report and Written Opinion received for PCT Patent Application No. PCT/US2014/047635, mailed on Nov. 7, 2014, 14 pages.

*Primary Examiner* — Fenn Mathew
*Assistant Examiner* — Don M Anderson
(74) *Attorney, Agent, or Firm* — Brake Hughes Bellermann LLP (57) ABSTRACT

Collapsible combustion containers are disclosed and described. Such combustion containers generally include a first pair of vertically oriented panels joined by a hinge and a second pair of vertically oriented panels joined by a hinge. The pairs of panels are hinged to one another to form a closed perimeter with a box like shape. One panel of the first pair may further include a relief space feature that creates a relief space so that the second pair of panels may be folded flat between the panels of the first pair when the container is collapsed for storage. Such combustion containers may burn a variety of fuels, including wood and other combustible matter, and be used as a portable stove or heating device and are especially useful during activities such as camping or backpacking, and for emergency preparedness reasons.

21 Claims, 8 Drawing Sheets

(56) References Cited

U.S. PATENT DOCUMENTS

| | | |
|---|---|---|
| 4,455,991 A | 6/1984 | Su |
| 4,455,992 A | 6/1984 | Hsiao |
| 4,794,906 A | 1/1989 | Longley, Jr. |
| 4,971,045 A | 11/1990 | Probst |
| 5,503,138 A * | 4/1996 | Chang .................. 126/25 R |
| 2008/0276926 A1 | 11/2008 | Chang |
| 2009/0020109 A1 | 1/2009 | Rheault |
| 2012/0073570 A1 | 3/2012 | Wall et al. |

\* cited by examiner

COLLAPSIBLE COMBUSTION CONTAINER DEVICES AND ASSOCIATED METHODS

PRIORITY DATA

This application claims the benefit of U.S. Provisional Patent Application Ser. No. 61/302,665, filed on Feb. 9, 2010, which is incorporated herein by reference.

FIELD OF THE INVENTION

The present invention relates generally to collapsible devices for containing a combustion reaction and methods for use thereof. Accordingly, the present invention involves the mechanical and material science fields.

BACKGROUND OF THE INVENTION

Portable stoves and other devices that allow the preparation and containment of a fire or other manner of combustion are often used when camping or during times of an emergency. Such devices are useful for cooking, water purification, heat, as well as other numerous uses.

Many of such devices are light weight and extremely portable, many also depend on a fuel canister in order to provide fuel for the fire. While such canisters are convenient, they typically provide only a finite and limited amount of fuel and will eventually become useless if not refilled once empty. Furthermore, such canisters present an extra object of significant size and weight that must be carried by a user. Other portable devices which are capable of utilizing wood or other fuel sources present the advantage of being able to use a perpetual supply of fuel that can be found in nature. However, such devices are often heavy, require assembly of several pieces, or are bulky to store.

SUMMARY OF THE INVENTION

Accordingly, the present invention provides collapsible combustion container devices that are capable of utilizing a variety of fuels, light weight, and that collapse into a small configuration for storage and portability.

In one aspect, the present invention provides a collapsible combustion container that includes a first pair of vertically oriented panels joined by a hinge, each panel having an equal width, and a second pair of vertically oriented panels joined by a hinge, each panel having an equal width that is less than the width of the panels of the first pair. A third hinge joins one panel from the first pair to one panel from the second pair, and a fourth hinge joins the other panel from the first pair to the other panel from the second pair, such that the pairs of panels form a closed box shaped perimeter with an external surface and an internal surface. The internal surface generally defines an open space suitable for containing a combustion reaction. The box is collapsible from an open configuration to a closed configuration in a two step process by first folding the second pair of panels so that the interior surfaces thereof move toward the interior surfaces of the first pair of panels, and second by further folding the second pair of panels so that the exterior surfaces thereof move toward one another and the second pair of panels is held between the first pair of panels. The container also includes at least one relief space feature in at least one of the panels of the first pair, such that a relief space is created between the first pair of panels when folded together, said relief space being of sufficient size to accommodate a thickness of the folded second pair of panels located between the first pair of panels and allow the first pair of panels to be oriented substantially parallel to one another in the folded configuration with the second pair of panels held folded therebetween.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

In describing and claiming the present invention, the following terminology will be used in accordance with the definitions set forth below.

The singular forms "a," "an," and, "the" include plural referents unless the context clearly dictates otherwise. Thus, for example, reference to "a particle" includes reference to one or more of such particles, and reference to "the resin" includes reference to one or more of such resins.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

Figure 1:
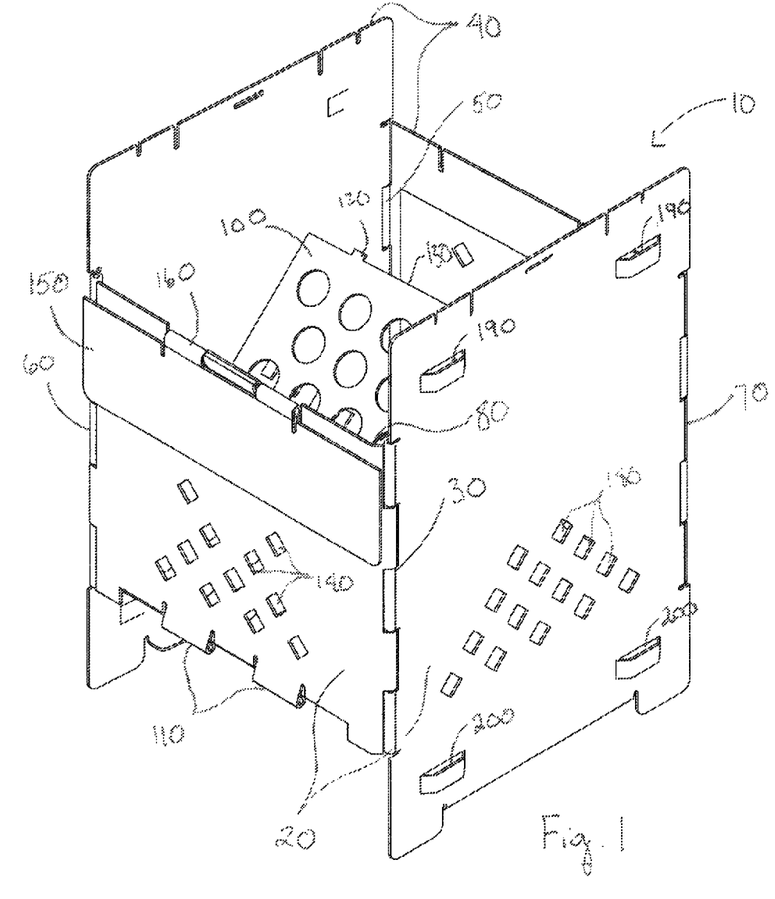
FIG. 1 is a corner top perspective view of a combustion container in accordance with one embodiment of the present invention.

The present invention provides collapsible combustion containers and methods for the use and fabrication thereof. Turning now to FIG. 1 is shown a collapsible combustion container in accordance with one embodiment of the present invention. The container 10 generally has a first pair of vertically oriented panels 20 joined to one another by a hinge 30. A second pair of vertically oriented panels 40 is also joined by a hinge 50. In one embodiment the panels of the first pair may each have an equal width, or a substantially equal width, and the panels of the second pair may each have an equal width or substantially equal width that is less than the width of the panels of the first pair. A third hinge 60 joins one panel from the first pair to one panel of the second pair, and a fourth hinge 70 joins the other panel from the first pair to the other panel of the second pair such that the pairs of panels form a box shaped perimeter. The box shaped perimeter may generally have an outside or exterior surface and an inside or interior surface. The open space created or defined between the interior surfaces of the panels is suitable for containing or housing a combustion reaction, such as a fire.

Figure 4A:
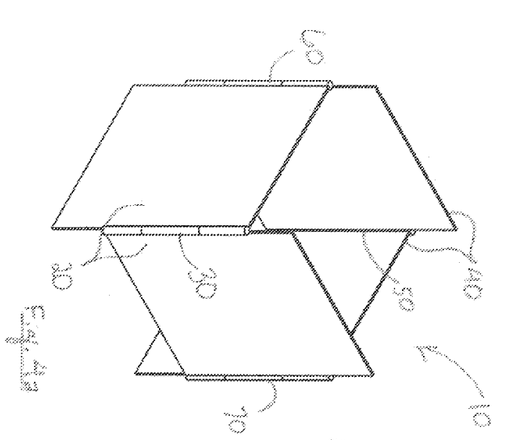
FIGS. 4a-4d show the steps of collapsing a combustion container in accordance with one embodiment of the present invention.
Figure 4B:
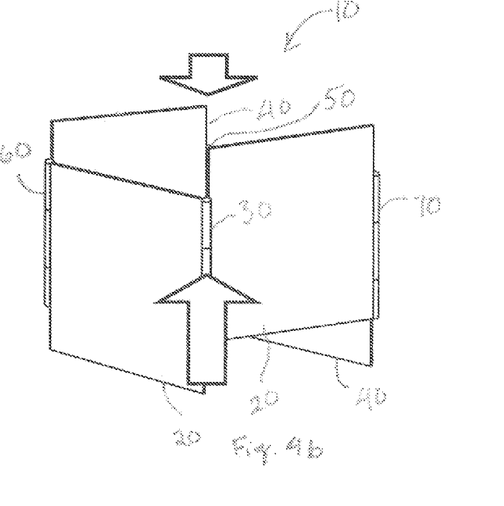

Referring now to FIGS. 4a-4d, is shown a sequence for collapsing a combustion container in accordance with one embodiment of the present invention. As shown in FIG. 4a, the container 10 stands fully open with the four vertically oriented panels, namely, the first pair 20 coupled to the second pair 40. The first pair of panels is joined by a hinge 30 and the second pair of panels is joined by a hinge 50. Third and fourth hinges, 60 and 70 respectively join the two pairs of panels together in a box shaped perimeter. The panels of the first pair are of substantially the same width as are the panels of the second pair. However, the panels of the second pair are of a smaller width than the panels of the first pair. As shown in FIG. 4b, a first step in collapsing the container is to move the in interior surface of the second pair of panels toward the interior surface of the first pair of panel, or alternatively, to move each pair of panels toward the other. This effectively moves hinges 30 and 40 toward one another. In so doing hinges 60 and 70 rotate from an approximate 90° angle to an angle that is 30° or less. Further, hinge 30 rotates from an approximate 90° angle to an angle of from 150° to 180° as does hinge 40. When moved far enough toward one another, the pairs of panels will eventually substantially contact one another. In other words, one panel from the first pair will substantially contact one panel from the second pair. In this configuration, the hinges 60 and 70 become completely closed.

Figure 4C:
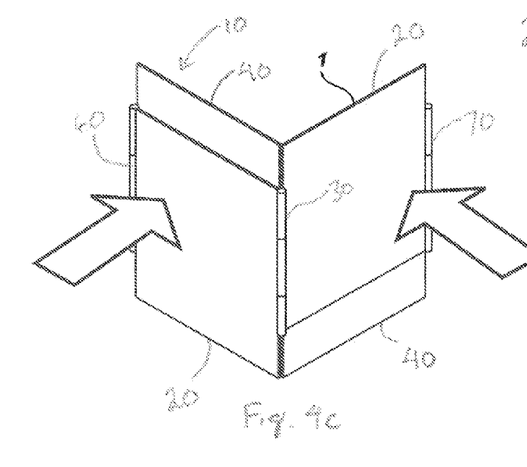
Figure 4D:
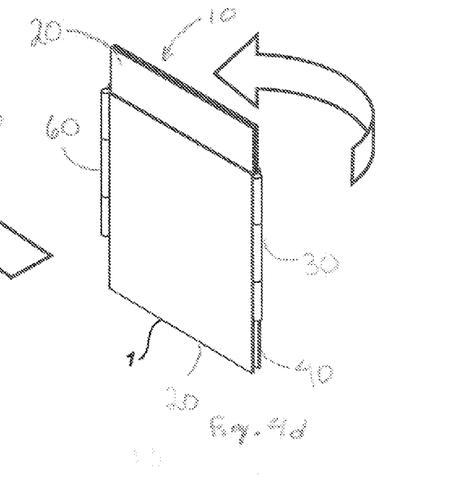

In FIG. 4c, the second step in collapsing the container is shown. At this point in the collapse process, the second pair of panels 40 are brought together so that the outside surfaces thereof move toward one another. Such motion now begins moving the hinge 30 from its previous 150° to 180° position to a closed position. Further, hinge 40 is moved from its previous 180° to a further obtuse angle which will eventually close when the hinge reaches an angle of 270° from its starting orientation. As such, in one embodiment, three hinges may be located substantially on the inside of the combustion container and one hinge can be located substantially on the outside. FIG. 4d shows the final collapsed configuration of the container with all hinges completely closed and the second pair of panels 40 held between the first pair of panels 20 and the outside surfaces of each panel of the second pair in substantial contact with one another so that in the collapsed configuration, the container will be flat with the first pair of panels on the outside of the second pair of panels and being oriented substantially parallel to one another.

The ability of the container to be oriented into such a flat final collapsed position with the panels of the second pair held between the panels of the first pair is provided by a relief space feature 80. Referring again to FIG. 1, one example of such a feature is shown. Further, such feature is well illustrated in FIG. 3. In this embodiment, the relief space feature is a crease, or bend, or fold, created in one of the panels of the first pair 20. As can be seen, the relief space feature runs substantially the entire length of the panel and is parallel, or substantially parallel to a vertical edge thereof. Moreover, the relief space feature has a bend of sufficient size to create a relief space that accommodates the entire thickness of the second pair of panels. The amount of relief space needed can be selected in order to achieve a specific result as needed. For example, as the thickness of the panels of the second pair vary, so can the amount of relief space provided. This can be achieved by controlling the amount and severity of the crease or bend. Further, in some aspects, multiple creases or bends can be used.

Figure 5A:
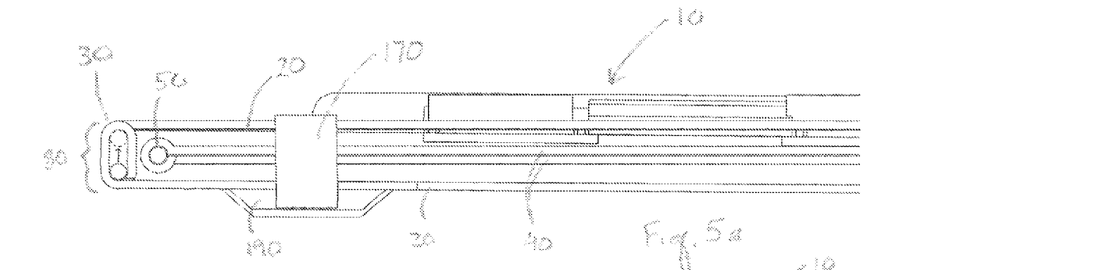
FIGS. 5a-5c show a top view of various alternatives of relief space features in accordance with various embodiments of the present invention.
Figure 5B:
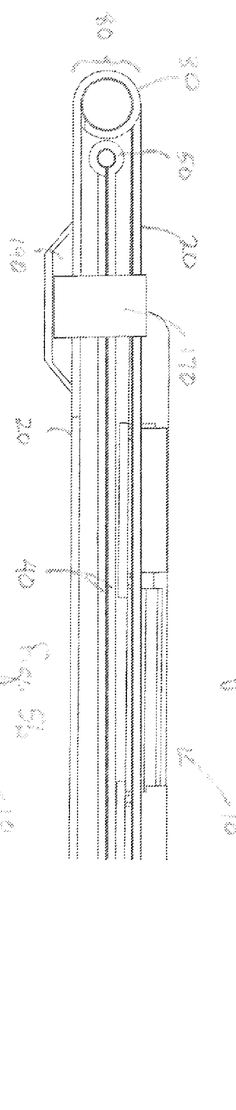
Figure 5C:
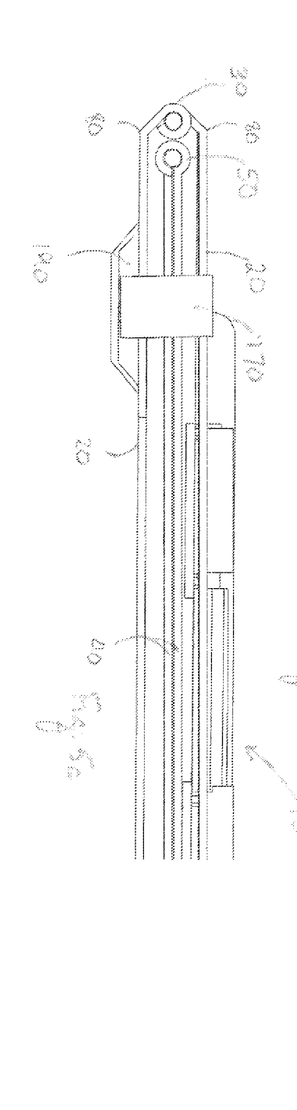

Referring now to FIGS. 5a-5c, is shown various alternative embodiments for a relief space feature 80 in accordance with the present invention. As shown in FIG. 5a, in one aspect, the hinge 30 that connects the panels of the first pair can be configured so that it is wider than a typical hinge and spread laterally. Alternatively, the hinge may actually be a double hinge with a solid connecting panel in between (not shown). In this case, the panel would actually present a fifth panel to the device and the dual hinge could be considered as separate hinges, or as a double hinge with dual rotational axis. As shown in FIG. 5*b*, another alternative relief space feature is to enlarge the hinge 30 which joins the panels of the first pair. Such enlargement can again be customized to provide the necessary amount of relief space required to achieve a desired result. Enlargement of part of the hinge, such as just the hinge casing, or of the hinge connecting pin 90, or of both may be used. Turning to FIG. 5*c*, is shown an embodiment of the invention wherein a crease or bend is made in each of the panels of the first pair in order to create the relief space feature. Like with crease or bend shown in FIGS. 1 and 3, the creases or bends in FIG. 5*c* run the entire height of each panel of the first pair, and also run substantially parallel to an edge thereof. Further, such creases, folds, or bends, can have a combined size sufficient to create the relief space desired and may take the form of various different angles, curves, etc., as required to achieve a specific result.

Referring again to FIG. 1, relief space feature 80 may be located laterally at any desired point in the panel. However, in one aspect, it may be located between the middle of the panel and the hinge joining the panels of the first pair. In another aspect, the relief space feature may be located at a location that substantially matches a location to which the hinge 40 joining the pair of second panels extends between the first pair of panels when the container of the present invention is in a fully collapsed orientation or configuration. This is true when one or multiple bends, creases, or folds are used to create the relief space feature.

In another embodiment, the relief space feature 80 may include multiple bends, folds, or creases in the same panel. Each crease, bend, or fold runs the entire length (i.e. height) of the panel, and runs substantially parallel to a vertical edge thereof. The cumulative fold or bend of such feature will typically have a size that is cumulatively sufficient to create a relief space that accommodates the entire thickness of the folded panels of the second pair. In some embodiments, one crease, bend, or fold may be located proximate to one hinge of a panel and a second crease, bend, or fold may be located proximate to the other hinge of the same panel. In other words, one crease, bend, or fold may be proximate to the hinge 30 joining the panels 20 of the first pair, while the second crease, fold, or bend may be located in the same panel, but proximate to either the third hinge 60 or the fourth hinge 70. In some aspects, both panels of the first pair may have relief space features that include two or more bends, creases, or folds as recited herein.

Figure 2:
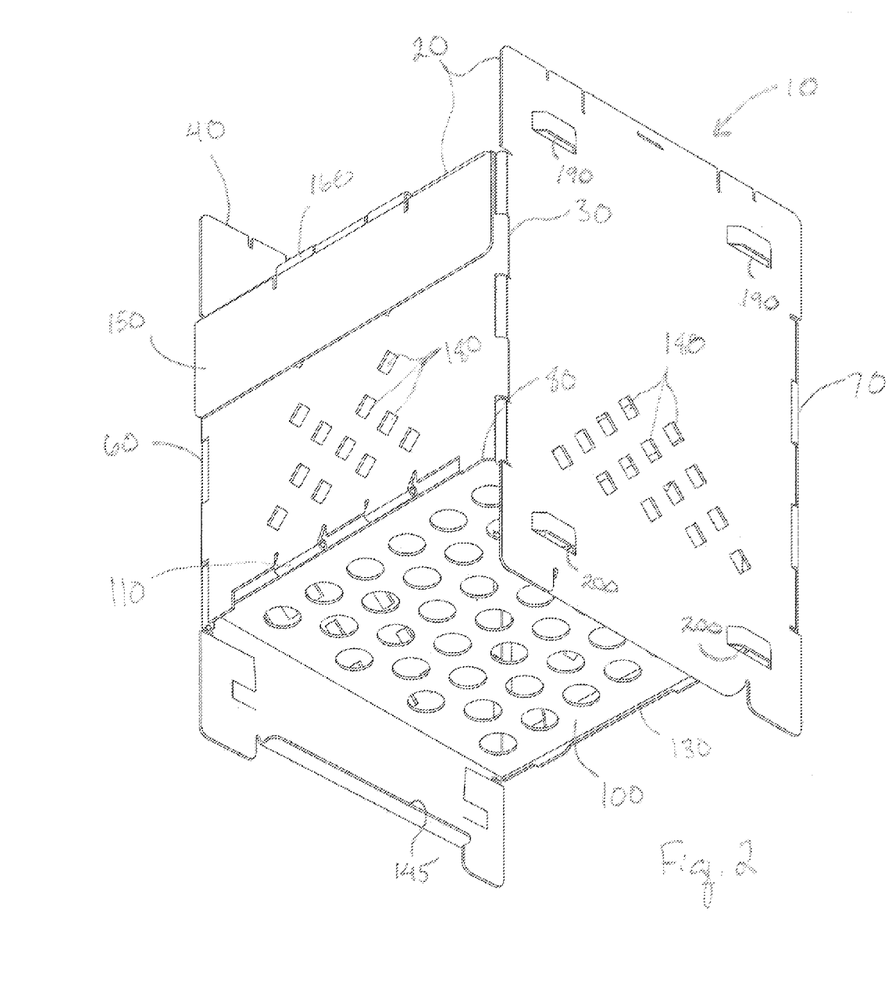
FIG. 2 is a corner bottom perspective view from the same corner as in FIG. 1, of a combustion container in accordance with one embodiment of the present invention.
Figure 8:
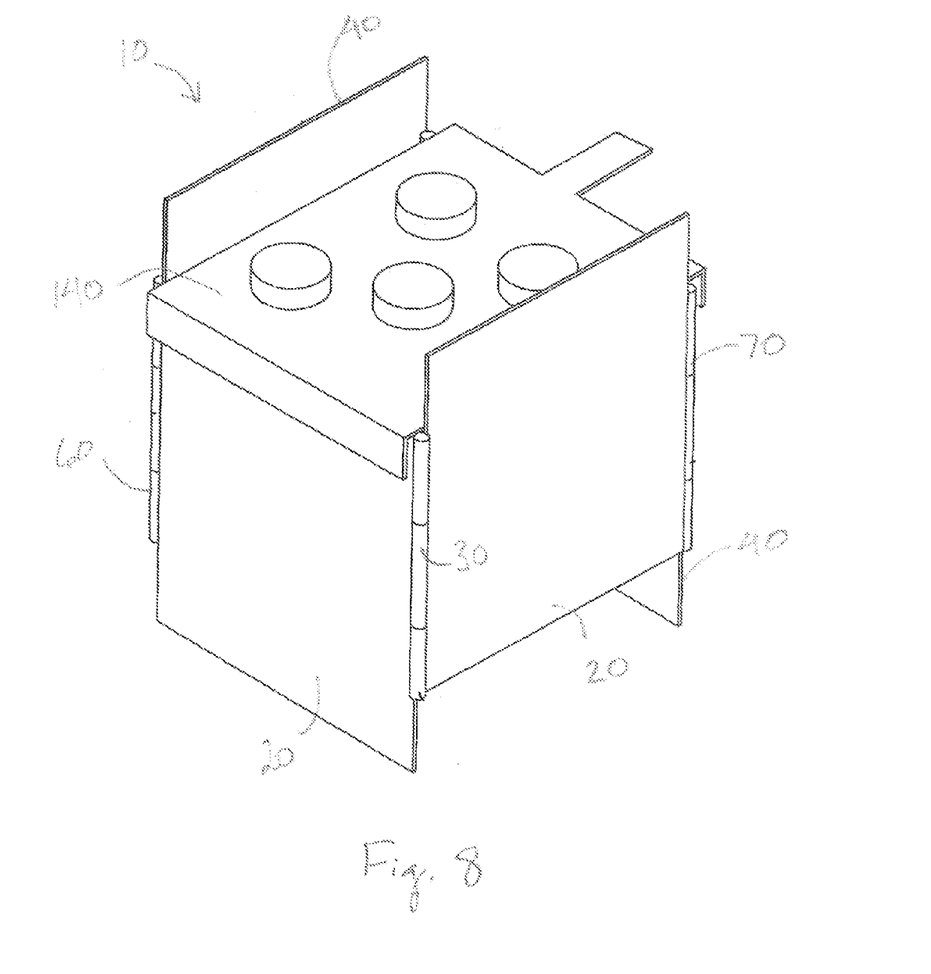
FIG. 8 shows a top perspective view of a combustion container where the ash tray is engaged over a top opening in accordance with one embodiment of the present invention.

Referring now to FIG. 2, is shown a combustion plate 100. Combustion plate 100 is the primary surface upon which the combustion reaction, such as a fire, may take place. In some embodiments, the combustion plate may be hingedly joined with a hinge 110 to one of the panels of either the first or second pair, and in yet a further embodiment, the hinge may allow the combustion plate to pivot in an upward direction between the panels when the combustion container is being collapsed for storage. In such a case, the combustion plate will also fit into the relief space and the thickness of the relief space may be adjusted to accommodate the presence of the combustion plate. Further as shown in FIGS. 1, 2, and 8*b*, in some embodiments, the hinge 110 may be angled or relieved out of the plane in which the panel to which it is attached resides. An advantage created by such angling is that it allows the combustion plate to rest substantially flat against the panel to which it is hinged when folded into an upright position. Such flat abutment reduces the amount of relief space required to allow the container 10 to be flat when in a collapsed configuration. Thusly, the angling of the hinge effectively decreases the thickness of the device when folded into the collapsed configuration. In some aspects, the amount of angle of the hinge may be equal or substantially equal to a thickness of the combustion plate.

In some embodiments the combustion plate 100 may be attached either to a panel of the first pair 20 or a panel of the second pair 40. In one specific embodiment, the combustion plate may be attached to a panel of the first pair which has a relief space feature therein. In another embodiment, the combustion plate may be attached to a panel of the second pair which folds up against the panel of the first pair having the relief space feature therein. In another embodiment, the combustion plate may not fold between the panels when the container 10 is collapsed, but may fold toward an outside surface thereof instead.

Figure 3:
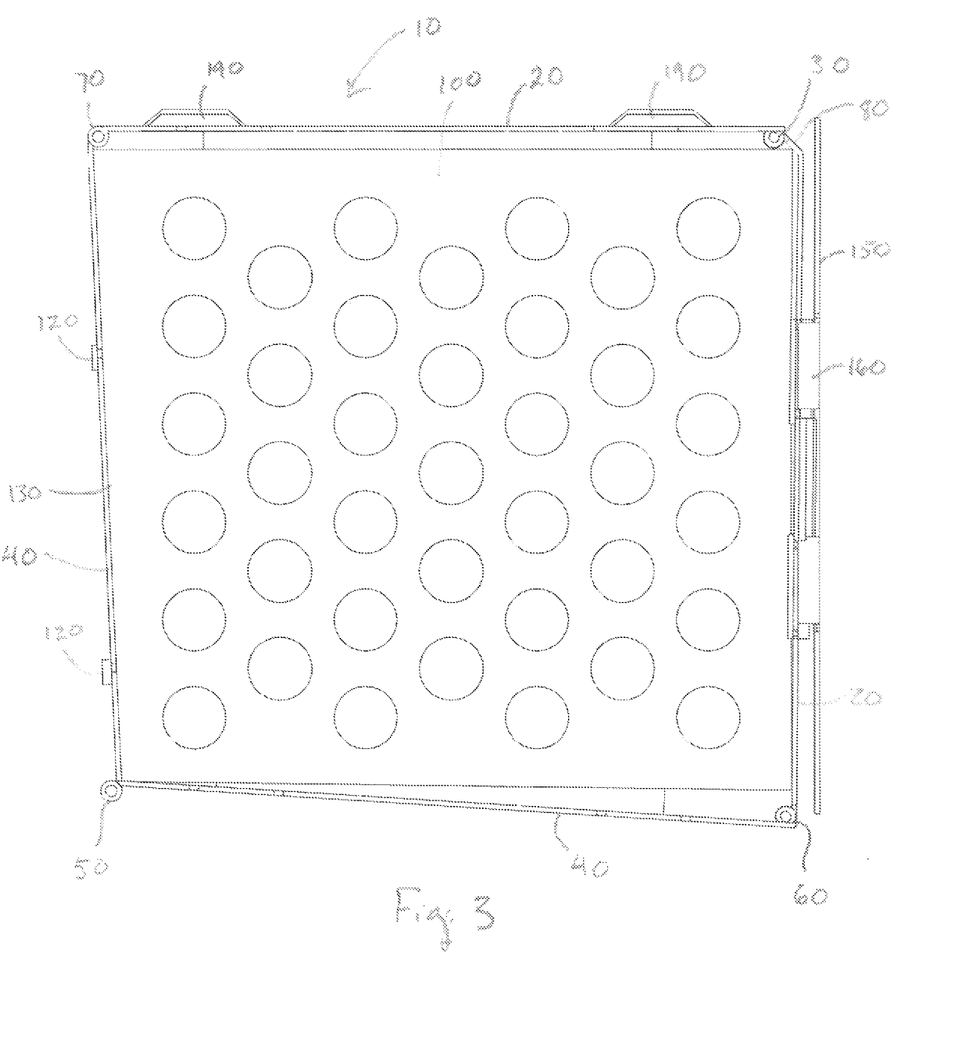
FIG. 3 is a top view of a combustion container in accordance with one embodiment of the present invention.

As shown in FIG. 3, in one embodiment, the combustion plate 100 may have tabs 120 formed along a swinging edge 130 of the plate. The tabs may fit into slots located in a panel across from the panel to which the plate is hinged. Such tabs may fit through holes or grooves in the corresponding plate to provide a resting surface upon which the edge of the plate may rest when in a lowered position so as to create a flat surface with the plate extending across the bottom of the open space, or combustion space of the container. The flat surface can then be used to support a combustion reaction, such as a fire or other form of combustion. Additional mechanisms, such as ledges or tabs, slots, grooves, etc. can be used to catch and engage the swinging edge of the combustion plate whether or not tabs are used. As depicted, the combustion plate includes a plurality of apertures or holes therein for the purposes of ventilation. Such holes can take nearly any shape or size desired in order to achieve a specific end result and may in some aspects be specifically formed to accommodate a specific level of ventilation for a specific combustion material. Moreover, the combustion plate need not be fixed in position, or located only along the bottom edge of one panel as shown. Rather, the plate can be positioned at any height within the open space of the container and can be either permanently or temporarily fastened therein, for example by providing ledges or slots or grooves into on which the plate can rest.

Figure 7:
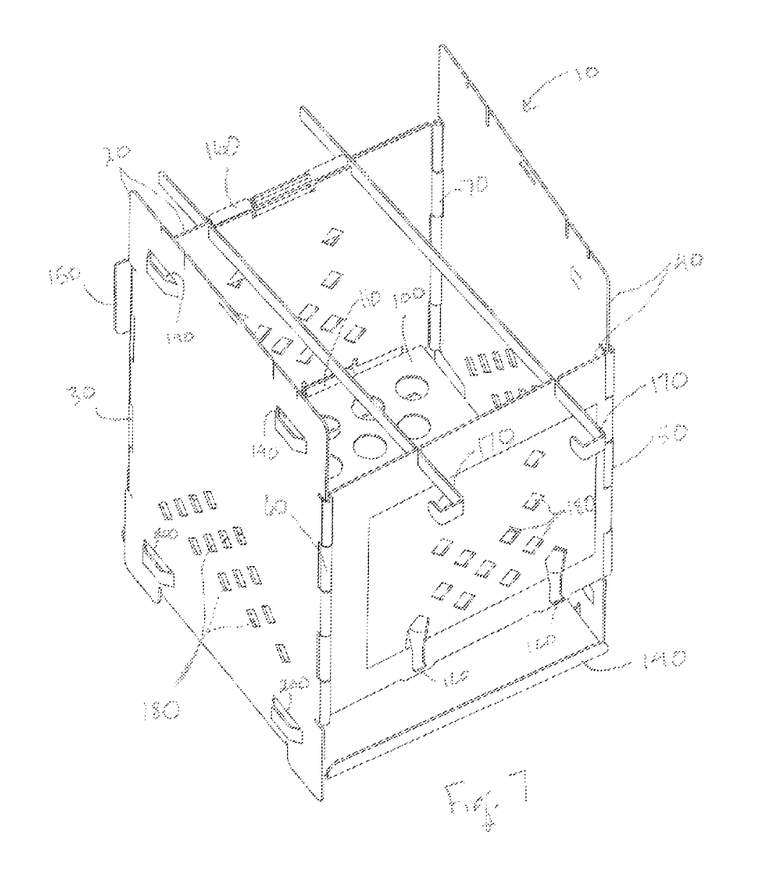
FIG. 7 shows a top perspective view of a combustion container having pins fitted into slots across the top of two panels and an ash tray engaged in a bottom portion of the container in accordance with one embodiment of the present invention.

Referring to FIG. 7 in one embodiment of the present invention, an ash tray 140 may be used to collect ashes or other debris falling from the combustion plate 100. Generally the ash tray is a solid sheet of material that is combustion proof or fire proof, such as the metal material of the rest of the container unit. In some aspects the ash tray is substantially flat, and may in some embodiments have upwardly curling edges on opposing ends thereof. Such ends facilitate or ease the ability of a user to grasp the ash tray when placed on the ground or other flat surface. Additionally, as shown in FIG. 8, in some embodiments, the ash tray may have a handle or other features which allow its handling when hot.

In some embodiments, the ash tray may fit snugly between opposing panels of the container. In some embodiments, the shape of the ash tray may be tapered at one end in order to accommodate a tapered trapezoidal or trapezium shape of the opening of the container in view of the fact that the second pair of panels are each more narrow than the panels of the first pair. In some aspects, the opposing panels may have a lip 145, ledge, slot, or other mechanism for engaging the ash tray and holding it up above a surface upon which the combustion container rests when in use.

Referring again to FIG. 1, in some aspects of the present invention, each pair of panels may have one panel of a first height or size and another panel of a second height or size.

However, it is to be understood that in some embodiments all of the panels may be of substantially the same size or height, or three panels may be of one size with a fourth panel of a different size, either smaller or larger. In some the embodiment depicted in FIG. 1, the taller panels reach to substantially the same height and the shorter panels also reach to substantially the same height. As such, it is simple to place a frying pan or other cooking device or utensil across the top edge of the two higher panels for cooking or heating purposes.

In some embodiments of the invention, a damper 150 may be connected to one or more of the shorter panels in order to extend its height and control air flow, or to provide a greater linear surface for cooking or resting a device upon. In some embodiments, the damper may be joined to the shorter panel with a hinge 160.

Referring again to FIG. 7, is shown a plurality of hooked pins 170. Such pins may serve a variety of functions to the device of the present invention and serve multiple purposes. As shown in FIG. 7, the hooked pins are engaged into slots along a top edge of the shorter panels. When so placed, the pins can be used to create an effective horizontally disposed surface onto which a plate, such as a combustion plate, or other items can be placed. Thus, the height of the combustion reaction can be varied according to desire. In some aspects, an alternative fuel source, such as a sterno can or other packaged fuel may be set directly upon such pins. In another aspect, a plate suitable to serve as a combustion plate may be placed upon the pins. In yet another aspect, the pins may be made of a suitable size so as to engage the ventilation openings 180, which can optionally be made in the panels as shown in FIG. 7. In one aspect, the openings may be patterned in a fashion to provide incremental height adjustment for the pins as well as serving the purpose of ventilation. In some aspects the openings may be a square shape and the width of the curved pins can substantially match the distance between two or more corners of the openings. Other shapes for the openings may be used, such as circular, elongated, slits, etc., and the size thereof may be varied according to need. Likewise, the shape of the curved pins can also be varied and can be rounded, half circular, triangular, or flat in the cross section thereof. As illustrated in the present figures the pins are shown with a flat cross section.

In addition to having the curved pins 170 serve the purpose of providing a variable height for a combustion plate, in one aspect, the ash tray may also serve such a purpose. As shown in FIG. 8 in one embodiment, the ash tray 140 may be placed over the top edges of the shorter panels and used to elevate the combustion reaction closer to the top edges of the taller panels. Such a surface is particularly useful when the combustion source is fuel tabs or other solid combustible fuel that produces low height flames. However, it is to be understood that a variety of fuel types may be used with the container of the present invention placed in such a configuration.

Figure 6A:
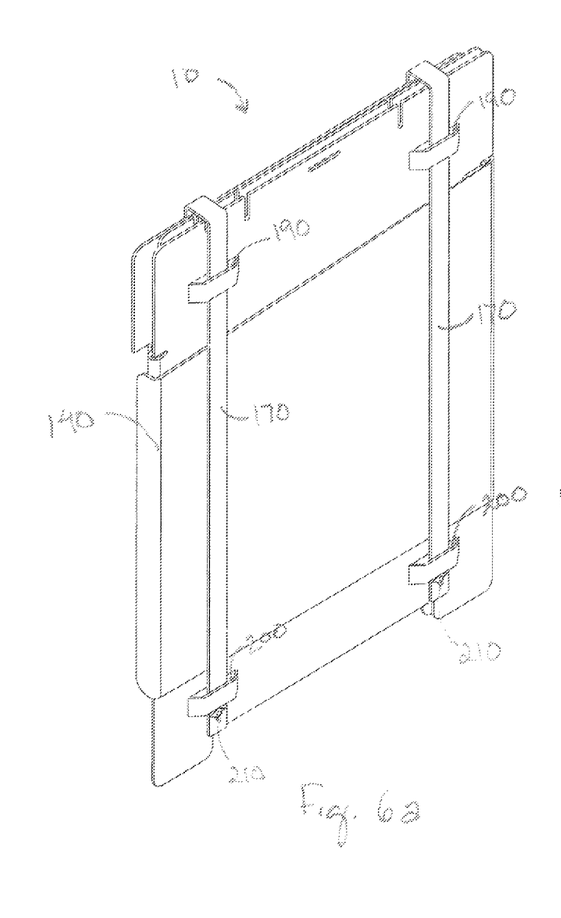
FIGS. 6a and 6b show opposite sides of a fully collapsed combustion container in accordance with one embodiment of the present invention.
Figure 6B:
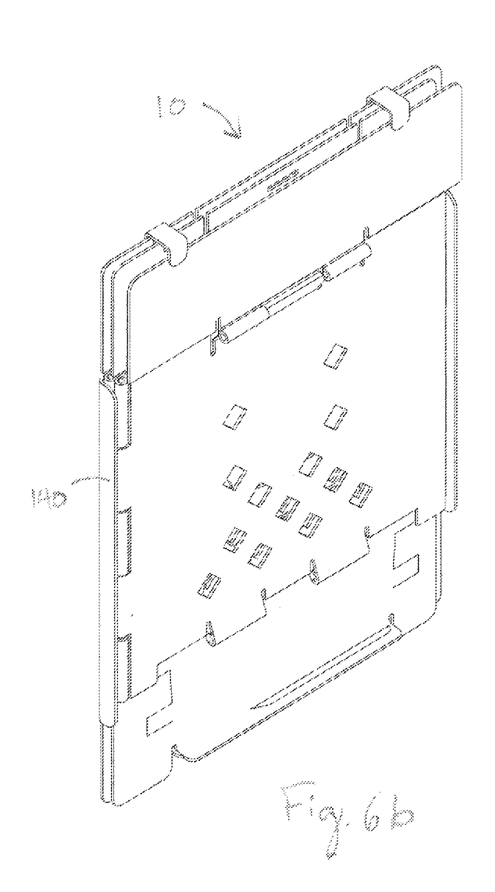

Referring now to FIGS. 6a and 6b is shown the combustion container 10 of the present invention in a fully collapsed state or orientation. In one embodiment of the invention, one of the panels of the first pair may have a top pair of vertical apertures 190 and a bottom pair of vertical apertures 200. When so configured, the curved pins 170 may be utilizes as a mechanism for bundling and/or securing the combustion container in a collapsed configuration or orientation. Specifically, the curved pins may be inserted into and extended through the pairs of apertures. When sized appropriately, the curved or hooked part of the pin may also extend over the top edge of all folded panels and onto the other side of the folded container. The pin may then be secured down so that the hook or curve prevents the opening of the device from the collapsed position until the pins are removed. Moreover, in some embodiments, the vertically oriented apertures may be sufficiently raised so as to allow placement of the ash tray 140 between the pins and the panel containing the vertical apertures. In this way the ash tray can be held securely in place with the rest of the container unit for storage purposes. As such, in some aspects, the width of the vertically oriented apertures may be sufficient to accommodate the thickness of a pin and the thickness of an ash tray. In some aspects, the curved or hooked pins may have a protrusion 210 located on a back surface opposite the hooked end. Such protrusion or bump may aid in holding the pins securely through the vertical apertures when so engaged.

In some aspects, a cooking or heating surface or plate (not shown) may be placed across the top edges of the tallest panels to aid in cooking or heating. In some aspects, such a plate can be hingedly joined to one of the panels and folded back against an outside surface thereof when not in use, or when the container is collapsed. Further, while it is possible that all of the hinges utilized be permanently affixed, it is also possible that the pins of such hinges be made to be removable, so that the various hinged connections or joints can be separated and the unit made modular. In addition, it is to be understood that the container unit can be made in a variety of sizes for a variety of different purposes. Such sizes may range from about 6 inches tall and 6 inches wide up to about 36 inches tall and 36 inches wide, or even larger as required suiting a particular purpose. In a further aspect, multiple containers can be joined or placed in an interconnected configuration in order to assemble a multi-burner unit.

The combustion container and its various parts may be made from a variety of materials which can withstand the exposure to heat produced by the combustion process. Metals, such as iron, steel, stainless steel, aluminum, bronze, tin, and the like, as well as alloys thereof may be used.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A combustion container comprising:
   a first pair of panels joined by a first hinge;
   a second pair of panels joined by a second hinge;
   a third hinge joining a first panel of the first pair of panels to a first panel of second pair of panels;
   a fourth hinge joining a second panel of the first pair of panels to a second panel of the second pair of panels such that the first pair of panels and the second pair of panels form a box-shaped perimeter with an external surface and an internal surface, the internal surface of the box-shaped perimeter defining an open space, the combustion container being collapsible from an open configuration to a closed configuration, the first panel from second pair of panels having an interior surface facing an interior surface of a first panel of the first pair of panels when the combustion container is in the closed configuration, and the first panel of the second pair of panels having an exterior surface facing an exterior surface of the second panel of the second pair of panels when the combustion container is in the closed configuration, the first panel from the first pair of panels has a width different than a width of the first panel from the second pair of panels, each of the panels from the first pair of panels has a same width, the second panel from the first pair of panels has a width different than a width of the second panel from the second pair of panels, each of the panels from the second pair of panels has a same width;

a relief space feature included in only one panel of the first pair of panels such that a relief space is defined between the first pair of panels when the combustion container is in the closed configuration; and a hinge connecting pin included in each of the first, second, third, and fourth hinges while moving the combustion container from the open configuration to the closed configuration.

2. The combustion container of claim 1, wherein the relief space feature includes at least one crease in the one panel of the first pair of panels, the at least one crease is disposed along an entire height of the one panel, the at least one crease is aligned substantially parallel to the first hinge.

3. The combustion container of claim 2, wherein the crease is located between a middle of the one panel and the first hinge joining the panel of the first pair of panels.

4. The combustion container of claim 1, wherein the relief space feature includes a crease in the one panel of the first pair of panels, the second hinge is disposed between the first pair of panels when the combustion container is in the closed configuration, the crease is positioned in the one panel at a location that is substantially aligned with a location to which the second hinge joining the second pair of panels extends between the first pair of panels when the combustion container is in the closed configuration.

5. The combustion container of claim 1, wherein the relief space feature is included in the one panel of the first pair of panels.

6. The combustion container of claim 1, wherein the relief space feature includes the first hinge, the first hinge being larger than the second hinge.

7. The combustion container of claim 6, wherein the relief space feature includes the first hinge, the first hinge has a hinge casing larger than a hinge casing of the second hinge.

8. The combustion container of claim 6, wherein the relief space feature includes the first hinge, the first hinge includes a hinge extension.

9. The combustion container of claim 1, further comprising a combustion plate hingedly attached to at least one panel of the first pair of panels or the second pair of panels and oriented in a horizontal plane substantially perpendicular to a vertical plane in which the at least one panel is oriented when the combustion container is in the open configuration.

10. The combustion container of claim 9, wherein the combustion plate is disposed in the relief space between the first panel of the first pair of panels and the first panel of the second pair of panels when the combustion container is in the closed configuration.

11. The combustion container of claim 9, further comprising a combustion plate disposed outside an exterior surface of the combustion container when the combustion container is in the closed configuration.

12. The combustion container of claim 1, further comprising an ash tray configured to engage a bottom portion of the combustion container.

13. The combustion container of claim 1, wherein the second hinge is disposed exterior to the box shaped perimeter when the combustion container is in the open configuration, the first hinge is disposed interior to the box shaped perimeter when the combustion container is in the open configuration.

14. The combustion container of claim 1, wherein the first panel of the first pair of panels is vertically offset along the hinge from the second panel of the first pair of panels.

15. The combustion container of claim 1, further comprising a pin having a hook portion, the pin configured to engage a ventilation opening included in the combustion container.

16. The combustion container of claim 1, further comprising:
an aperture included in at least one of the panels from the first pair of panels; and
a curved pin having at least a portion disposed within the aperture when the closed configuration.

17. The combustion container of claim 1, wherein the internal surface of the box-shaped perimeter defines a non-square shape where the first pair of panels define a non-perpendicular angle when in the open configuration and where the second panel from the first pair of panels and the second panel from the second pair of panels define a non-perpendicular angle when in the open configuration.

18. A combustion container, comprising:
a first pair of panels joined by a first hinge;
a second pair of panels joined by a second hinge, a first panel from the second pair of panels being hingedly coupled to a first panel from the first pair of panels via a third hinge, a second panel from the second pair of panels being hingedly coupled to a second panel from the first pair of panels via a fourth hinge, the first pair of panels and the second pair of panels defining a box-shaped perimeter when the combustion container is in an open configuration,
the second hinge being disposed between the first pair of panels when the combustion container is in a closed configuration,
the second hinge being disposed exterior to the box-shaped perimeter when the combustion container is in the open configuration, the first hinge, the third hinge, and the fourth hinge being disposed interior to the box-shaped perimeter when the combustion container is in the open configuration,
the first panel from the first pair of panels has a width different than a width of the first panel from the second pair of panels, each of the panels from the first pair of panels has a same width, the second panel from the first pair of panels has a width different than a width of the second panel from the second pair of panels, each of the panels from the second pair of panels has a same width;
a relief space feature included in the first panel of the first pair of panels and excluded from the second panel of the first pair of panels, and excluded from each of the panels of the second pair of panels; and a hinge connecting pin included in each of the first, second, third, and fourth hinges while moving the combustion container from the open configuration to the closed configuration.

19. The combustion container of claim 18, wherein the relief space feature is a crease included in the first panel from the first pair of panels, the box-shaped perimeter having a non-square shape.

20. The combustion container of claim 18, wherein the first hinge is aligned along a vertical direction, the first pair of panels is vertically offset from the second pair of panels.

21. The combustion container of claim 18, wherein the first pair of panels define a non-perpendicular angle when in the open configuration, the second panel from the first pair of panels and the second panel from the second pair of panels defining a non-perpendicular angle when in the open configuration.

* * * * *

UNITED STATES PATENT AND TRADEMARK OFFICE
CERTIFICATE OF CORRECTION

Page 1 of 1

PATENT NO. : 9,702,563 B2
APPLICATION NO. : 13/023766
DATED : July 11, 2017
INVENTOR(S) : Probst et al.

It is certified that error appears in the above-identified patent and that said Letters Patent is hereby corrected as shown below:

On the Title Page

At Item (75), Inventors: At Line 3 insert the name --Adrian Sosa, Springville, UT (US)--

Signed and Sealed this
Tenth Day of December, 2019

Andrei Iancu
*Director of the United States Patent and Trademark Office*